United States Patent
Hyysti

(10) Patent No.: US 7,221,995 B2
(45) Date of Patent: May 22, 2007

(54) METHOD FOR DETERMINATION OF OPTIMAL SPIN AXIS FOR A LOG FOR PEELING IN A VENEER LATHE

(75) Inventor: Mika Hyysti, Lahti (FI)

(73) Assignee: Raute Oyj, Nastola (FI)

( * ) Notice: Subject to any disclaimer, the term of this patent is extended or adjusted under 35 U.S.C. 154(b) by 220 days.

(21) Appl. No.: 10/991,518

(22) Filed: Nov. 19, 2004

(65) Prior Publication Data

US 2005/0121108 A1 Jun. 9, 2005

(30) Foreign Application Priority Data

Nov. 24, 2003 (FI) .................................. 20031707

(51) Int. Cl.
G06F 19/00 (2006.01)
B27L 5/02 (2006.01)
G06G 7/48 (2006.01)

(52) U.S. Cl. ...................... 700/167; 700/173; 700/174; 700/180; 700/187; 700/192; 144/215.2; 703/6; 82/903

(58) Field of Classification Search ............ 700/29–32, 700/52, 54, 83, 97, 108–110, 114, 160, 163, 700/167, 173, 174, 180, 182, 187, 192, 193, 700/195; 144/209.1, 215.2; 703/2, 6, 7; 702/167; 82/903
See application file for complete search history.

(56) References Cited

U.S. PATENT DOCUMENTS 4,197,888 A    4/1980   McGee et al.
4,412,297 A    10/1983  Halgrimson et al.
4,884,605 A    12/1989  Ely
4,965,734 A *  10/1990  Edwards et al. ............. 144/357
5,394,342 A *  2/1995   Poon .......................... 702/137
6,116,306 A    9/2000   Ely
6,756,789 B1 * 6/2004   Parker et al. ................ 324/637

FOREIGN PATENT DOCUMENTS

FI       95883       12/1994

OTHER PUBLICATIONS

Finish Search Report No. FI20031707, dated Jul. 2, 2004, 3 pages.

* cited by examiner

*Primary Examiner*—Leo Picard
*Assistant Examiner*—Sean Shechtman
(74) *Attorney, Agent, or Firm*—Connolly Bove Lodge & Hutz LLP

(57) ABSTRACT

The invention relates to a method for centering a log for veneer peeling in a lathe. In the method the log is first centered in the centering arrangement of the lathe equipment using centering alignment data based on the contour of the log. On the basis of the thus determined centering data, a computer simulation of peeling is carried out and the results thereof are displayed. The operator performs an alternative centering based on visual evaluation of the log end and, using this centering data, another computer simulation of log peeling is carried out. The peeling outcomes are displayed as an image. The peeling outcomes of all simulations are compared with each other and the centering of actual peeling operation is performed using the centering data giving the optimum yield of peeling.

2 Claims, 2 Drawing Sheets

Figure 1:
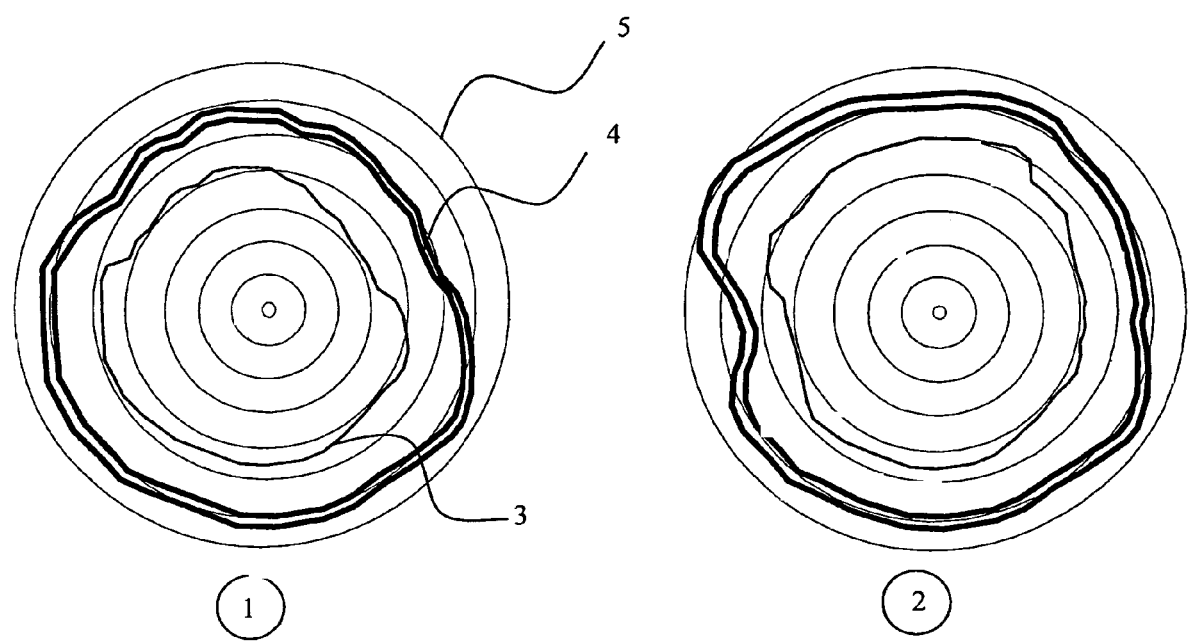

1 = joint veneer
2 = middle layer veneer
3 = middle layer veneer and surface layer veneer
4 = prima surface layer veneer
5 = joint veneer
6 = trash

METHOD FOR DETERMINATION OF OPTIMAL SPIN AXIS FOR A LOG FOR PEELING IN A VENEER LATHE

The invention relates to a visual control method for centering a log in a charging apparatus. i.e. to find a spin axis for the log resulting to an optimal peeling result in the subsequent veneer lathe.

Veneer lathe equipment is still known and widely used in the art where the centering of the log take place under visual inspection of the log end shape, and the log is clamped to the lathe chucks in accordance with the centering result.

To aid the visual centering operation, it is known in the art to project onto the log ends suitable alignment patterns that may comprise, e.g., concentric rings of different diameters. The center of the pattern is the intended spinning center point. Assisted by the projected pattern, the operating personnel of the lathe equipment perform log centering based on long-term experience, where the peeling yield is significantly dependent on the competence of the lathe operator. The peeling results of this arrangement have noted to correlate generally well with results obtained from logs peeled according to centering parameters computed from data received from apparatuses scanning the log contour.

The object of the present invention is to provide a facility for the operator to control the computational log centering procedure, and to give a wider selection of criteria for the determination of log centering parameters. The implementation of the centering method according to invention comprises the steps of first: scanning the log to determine the log as log contour digital values; performing computations to determine a digitized optimal spinning axis for the log on said log contour digital values; carrying out a computer simulated peeling based on said log contour digital values and said digitized optimal spinning axis; displaying the outcome of the computer simulated peeling as an image representing the peeled veneer from said computer simulated peeling; displaying at least one end surface of the log as an image; and inspecting and evaluating said image visually for determining at least one evaluated spinning axis. According to the characterizing features of the invention, a computer simulated peeling on said at least one evaluated spinning axis and on said log contour digital values is performed, the outcome of said computer simulated peeling on said at least one evaluated spinning axis and on said log contour digital values is displayed as an image representing the peeled veneer, and spinning axis parameters for the actual veneer peeling are selected from the group consisting of: said digitized optimal spinning axes and said at least one evaluated spinning axis.

In the implementation of the invention, the contour of a log to be peeled is determined using a variety of conventional and purposeful equipment capable of digitizing the shape of the log along its periphery and length, whereupon the thus obtained information can be processed computationally.

The contour of a log can be determined along its periphery using conventional devices such as one or more proximity sensors longitudinally displaced at a distance from each other along the length of the log and capable of measuring the distance between the log surface and the sensor. During measurement, the log is rotated about an axis, whereby the entire peripheral shape of the log can be determined. Equipment providing equivalent functions may alternatively be based on sensors recording the log dimensions by optical means. A measurement sensor may also be adapted movable in the longitudinal direction of a log's axis over the entire length of the log. Furthermore, x-ray equipment capable of imaging through the log, are advantageous by virtue of providing additional information from the internal structure of the log. The structural information complements the computation of the numerically controlled peeling thus aiding the determination of optimal peeling parameters.

Useful log shape information may also be obtained by imaging the log ends or at least one of them using digital imaging equipment.

Now operating in accordance with the invention, the practical knowledge of the operator performing the evaluation of the log spinning axis for peeling can be combined by computational means with information gathered from the log contour in order to obtain an optimal spinning axis.

In the method, computer simulated peelings are performed using the log centering parameters received by computational means on the one hand and by the visual evaluation performed by the operator on the other hand, and the peeling outcome of the simulated peelings are displayed as images permitting the operator to select on the displayed virtual peeling results the optimal centering parameters for the lathe, and the selected centering parameters are set for the actual peeling operation.

In a practical implementation of the invention it is also possible that the operator during the centering operation enters data required by the computational centering program, such as information on the minimum radius of the peelable layer for surface quality veneer in the log.

Figure 2:
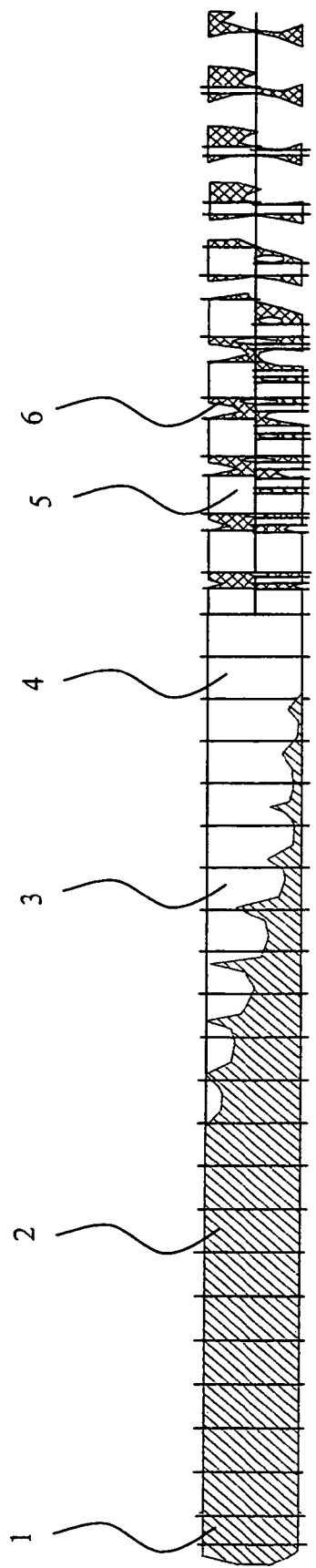

In the following, the invention is elucidated with the help of diagrams displayed to the lathe operator, wherein FIG. 1 shows the end shape images of a log; and FIG. 2 shows the peeling outcome of a computer simulation of veneer peeling based on a set of centering parameters.

Referring to FIG. 1, therein the left-side diagram, denoted with encircled "1", displays the left end of a log while the right-side diagram, denoted with encircled "2", shows the right end of the log (in regard to the advancing direction of the peeling operation). In the displayed image, the end image denotes the periphery 4 of the log on said end, as well as the first/semi-quality border (denoted as "3"), of the wood on the same log end. Additionally, in the diagram is displayed a ring pattern 5 aiding the centering procedure by way of allowing the lathe operator to displace the log end image relative to the ring pattern in order to determine the optimal turning center point on the basis of his visual evaluation and practical experience.

After the optimal turning center point has been computationally determined based on the scanned contour information of the log, the outcome of the computer simulated peeling is displayed to the operator in the form shown in FIG. 2, indicating the veneer quality grades available from the sheet cutting of the peeled web. In FIG. 2 the markings denote the following: "1"=joint veneer; "2"=middle layer veneer; "3"=middle layer veneer and surface layer veneer; "4"=prima surface layer veneer; "5"=joint veneer; and "6"=trash. In parallel therewith is shown on another display the respective peeling outcome of a computer simulated peeling that is run using the centering parameters based on the operator's visual evaluation of the log, whereupon the operator can perform a comparison between the displayed peeling outcome of the simulated peelings to decide which one of the centering alternatives gives a better peeling yield and, subsequently, enter the centering parameters of the higher yield to be set for the actual peeling operation. Furthermore, the operator has the option to perform a plurality of visual centering operations and to run the respective peeling simulations in order to get plural peeling results for the log to be peeled thus possibly finding a yet higher peeling yield.

What is claimed is:

1. A method for centering a log for peeling in a lathe, comprising:

scanning the log to determine log contour digital values;

performing computations to determine a digitized optimal spinning axis for the log on said log contour digital values;

performing an initial computer-simulated peeling based on the log contour digital values and said digitized optimal spinning axis; and displaying an outcome of said initial computer-simulated peeling as an image representing a peeled veneer from said computer-simulated peeling;

displaying at least one end surface of the log as an image;

visually inspecting and evaluating said image to determine at least one evaluated spinning axis;

performing a subsequent computer-simulated peeling on said at least one evaluated spinning axis and said log contour digital values;

displaying an outcome of said subsequent computer-simulated peeling as an image representing a peeled veneer; and selecting spinning axis parameters for an actual veneer peeling from the group consisting of: said digitized optimal spinning axis and said at least one evaluated spinning axis.

2. The method of claim 1, wherein said outcome of said initial computer-simulated peeling and the outcome of said subsequent computer-simulated peeling are displayed so as to indicate veneer quality cuttings.

* * * * *